(12) United States Patent
Friend (10) Patent No.: US 9,945,100 B2
(45) Date of Patent: Apr. 17, 2018

(54) POSITIONING SYSTEM AND METHOD FOR DETERMINING LOCATION OF MACHINE

(71) Applicant: Caterpillar Inc., Peoria, IL (US)

(72) Inventor: Paul R. Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 314 days.

(21) Appl. No.: 14/795,350

(22) Filed: Jul. 9, 2015

(65) Prior Publication Data

US 2017/0010363 A1    Jan. 12, 2017

(51) Int. Cl.
| | |
|---|---|
| G01S 19/14 | (2010.01) |
| E02F 9/20 | (2006.01) |
| G01S 19/42 | (2010.01) |
| G01S 19/49 | (2010.01) |
| G01S 19/43 | (2010.01) |
| E02F 9/26 | (2006.01) |

(52) U.S. Cl.
CPC ............ *E02F 9/205* (2013.01); *E02F 9/2054* (2013.01); *G01S 19/14* (2013.01); *G01S 19/426* (2013.01); *G01S 19/49* (2013.01); *E02F 9/268* (2013.01); *G01S 19/43* (2013.01)

(58) Field of Classification Search
None
See application file for complete search history.

(56) References Cited

U.S. PATENT DOCUMENTS

| | | | | |
|---|---|---|---|---|
| 6,133,874 A | * | 10/2000 | Krasner | G01S 19/235 342/357.43 |
| 8,872,700 B2 | | 10/2014 | Ashjaee et al. | |
| 8,922,426 B1 | * | 12/2014 | Smith | G01S 19/40 342/357.23 |
| 9,234,758 B2 | * | 1/2016 | Friend | G01B 11/00 |
| 9,250,086 B1 | * | 2/2016 | Friend | G01C 21/20 |
| 9,254,822 B1 | * | 2/2016 | Friend | B60T 7/12 |
| 2003/0191568 A1 | * | 10/2003 | Breed | B60W 40/06 701/36 |
| 2008/0109141 A1 | * | 5/2008 | Nichols | E02F 3/842 701/50 |
| 2010/0194634 A1 | * | 8/2010 | Biacs | G01S 19/23 342/357.31 |
| 2012/0109517 A1 | * | 5/2012 | Watanabe | G01C 21/28 701/431 |
| 2014/0207374 A1 | * | 7/2014 | Taylor, Jr. | G01C 21/16 701/470 |

(Continued)

*Primary Examiner* — Michael Lebentritt
(74) *Attorney, Agent, or Firm* — L. Glenn Waterfield (57) ABSTRACT

A positioning system for a machine is disclosed. The positioning system includes a satellite positioning unit to generate signals indicative of a location of the machine in a worksite and an inertial measurement unit (IMU) to generate signals indicative of a position of the machine. A controller is communicated with the satellite positioning unit and the IMU. The controller determines a first error value associated with a location of the machine based on signals received from the satellite positioning unit. The controller further determines a second error value associated with a location and a position of the machine based on signals received from the satellite positioning unit and signals received from the IMU, respectively. Further, a location of the machine is determined based on signals received from the satellite positioning unit and the IMU if the first error value is less than the second error value.

20 Claims, 5 Drawing Sheets

(56) References Cited

U.S. PATENT DOCUMENTS

| | | | |
|---|---|---|---|
| 2014/0236477 A1* | 8/2014 | Chen | G05D 1/0257 701/450 |
| 2014/0303923 A1* | 10/2014 | Friend | G01C 21/165 702/94 |
| 2014/0375497 A1* | 12/2014 | Friend | G01S 19/49 342/357.51 |
| 2015/0226550 A1* | 8/2015 | Chen | G01B 21/16 701/30.3 |
| 2016/0109583 A1* | 4/2016 | Willis | G01S 19/49 342/357.3 |
| 2016/0282127 A1* | 9/2016 | Goto | G01C 21/30 |

* cited by examiner

POSITIONING SYSTEM AND METHOD FOR DETERMINING LOCATION OF MACHINE

TECHNICAL FIELD

The current disclosure relates to a positioning system for a machine, and more particularly relates to the positioning system and a method of determining a location of the machine.

BACKGROUND

Machines, such as dozers, excavators, and drill machines, are controlled to perform various earth moving operations in a worksite. Generally, a positioning system is used for determining a location of the machine in the worksite. The positioning system combines GPS/GNSS information with inertial measurement unit (IMU) information to determine a position and orientation of the machine in the worksite. The GPS/GNSS information is generally received at various modes including RTK fixed mode, RTK float mode, Differential mode and Autonomous mode, and each of such modes is associated with an error. If the positioning system uses a high quality GPS/GNSS mode, such as the RTK Fixed mode and switch over to a lower quality GPS/GNSS mode, such as the Autonomous mode, then the GPS/GNSS signals received at the Autonomous mode can cause an offset error more quickly than if the positioning system uses the IMU to dead reckon. Hence, the positioning system may determine a location of the machine different from actual location of the machine in the worksite.

U.S. Pat. No. 8,872,700 (the '700 patent) discloses a GNSS surveying receiver with multiple RTK engines. The position of a global navigation satellite system (GNSS) surveying receiver is determined based on a plurality of RTK engines. A first RTK engine is implemented using a first set of parameters. A second RTK engine is implemented using a second set of parameter different than the first set. A plurality of GNSS signals are received from multiple satellites. At least one correction signal is received from at least one base receiver. A first position is determined from the first RTK engine based on the GNSS signals and the at least one correction signal. A second position is determined from the first RTK engine based on the GNSS signals and the at least one correction signal. A final position of the GNSS surveying receiver is determined based on the first position or the second position or a combination of both positions. The '700 patent does not disclose a positioning system that may be fused with an IMU to determine a location of the machine in an worksite based on error estimate associated with signals received from the satellites.

SUMMARY OF THE DISCLOSURE

In one aspect of the current disclosure, a positioning system for a machine is provided. The positioning system includes a satellite positioning unit disposed on the machine. The satellite positioning unit is configured to generate signals indicative of a location of the machine in a worksite. The positioning system further includes an inertial measurement unit (IMU) disposed in the machine. The IMU is configured to generate signals indicative of a position of the machine. The positioning system further includes a controller in communication with the satellite positioning unit and the IMU. The controller is configured to determine a first error value associated with a location of the machine based on the signals received from the satellite positioning unit. The controller is further configured to determine a second error value associated with a location and a position of the machine based on the signals received from the satellite positioning unit and the signals received from the IMU, respectively. The controller is further configured to compare the first error value with the second error value and determine a location of the machine based on the signals received from the satellite positioning unit and the IMU, if the first error value is less than the second error value.

In another aspect of the current disclosure, a method of determining a location of a machine is provided. The method includes determining a first error value associated with a location of the machine based on signals received from a satellite positioning unit. The method further includes determining a second error value associated with a location and a position of the machine based on signals received from the satellite positioning unit and signals received from an inertial measurement unit (IMU), respectively. The method further includes comparing the first error value with the second error value and determining a location of the machine based on the signals received from the satellite positioning unit and the IMU, if the first error value is less than the second error value.

In yet another aspect of the current disclosure, a machine is provided. The machine includes a frame and a satellite positioning unit disposed on the frame. The satellite positioning unit is configured to generate signals indicative of a location of the machine in a worksite. The machine further includes an inertial measurement unit (IMU) disposed in the machine. The IMU is configured to generate signals indicative of a position of the machine. The machine further includes a controller in communication with the satellite positioning unit and the IMU. The controller is configured to determine a first error value associated with the location of the machine based on the signals received from the satellite positioning unit. The controller is further configured to determine a second error value associated with the location and the position of the machine based on the signals received from the satellite positioning unit and the signals received from the IMU, respectively. The controller is further configured to compare the first error value with the second error value and determine the location of the machine based on the signals received from the satellite positioning unit and the IMU, if the first error value is less than the second error value.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
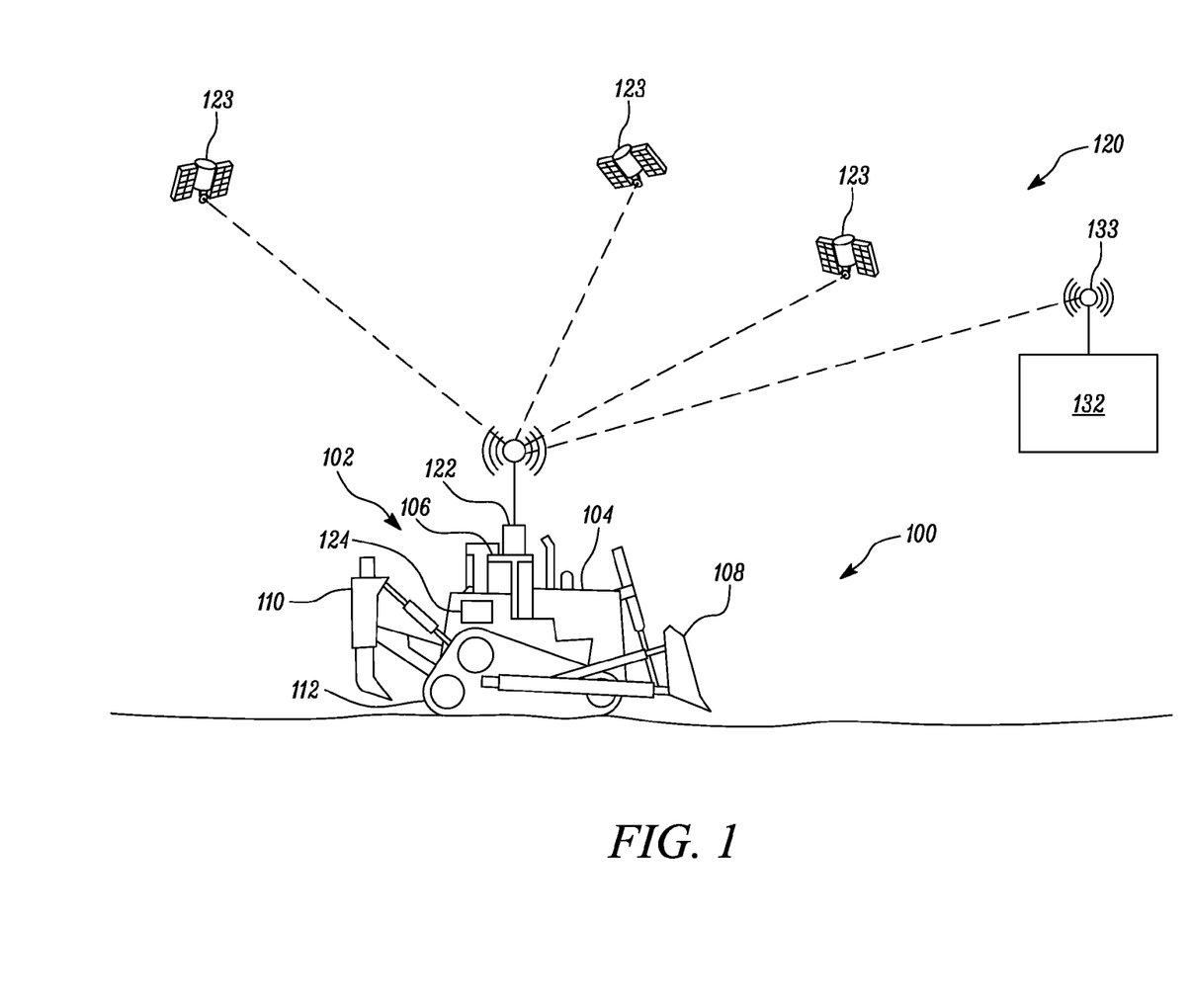
FIG. 1 is a schematic side view of an exemplary worksite and a machine operating in the worksite, according to an aspect of the current disclosure.

FIG. 1 illustrates a schematic side view of a worksite 100 and a machine 102 operating in the worksite 100. The worksite 100 may be a portion of a mining site, a landfill, a quarry, a construction site, a road worksite, a forest, a farm, or any other area in which movement of material is desired. In the illustrated aspect of the current disclosure, the machine 102 is a dozer that is configured to perform a ripping operation and a cutting operation in the worksite 100. In other aspects of the current disclosure, the machine 102 may be an on-highway vehicle or an off-highway vehicle, such as an excavator, a backhoe, a loader, a motor grader, or any other vehicle that may be used for performing various earth moving operations. The earth moving operations may include a dozing operation, a grading operation, a leveling operation, a bulk material removal operation, or any other type of operation that may result in altering topography of the worksite 100. The machine 102 may be further configured to be controlled in an autonomous mode, a semi-autonomous mode, or a manual mode.

The machine 102 includes a frame 104 for supporting various components of the machine 102 including an operator cab 106, a cutting tool 108 and a ripping tool 110. The machine 102 further includes a pair of tracks 112 to engage with a work surface and to move the machine 102 along the work surface to perform the ripping and cutting operations. The tracks 112 may be supported from the frame 104 and may receive a driving power from an engine (not shown) to move the machine 102 in the worksite 100. It may also be contemplated that the machine 102 may include a plurality of wheels to engage with the work surface. The engine may be disposed at any location in the frame 104 to supply power to various systems of the machine 102, such as a hydraulic system. The hydraulic system may be in fluid communication with the cutting and ripping tools 108, 110 for performing the ripping and cutting operations. The operator cab 106 may include multiple control levers and/or switches for controlling movement of the machine 102 and the ripping and cutting operations of the machine 102. The machine 102 further includes a positioning system 120 configured to determine a location of the machine 102 in the worksite 100.

Figure 2:
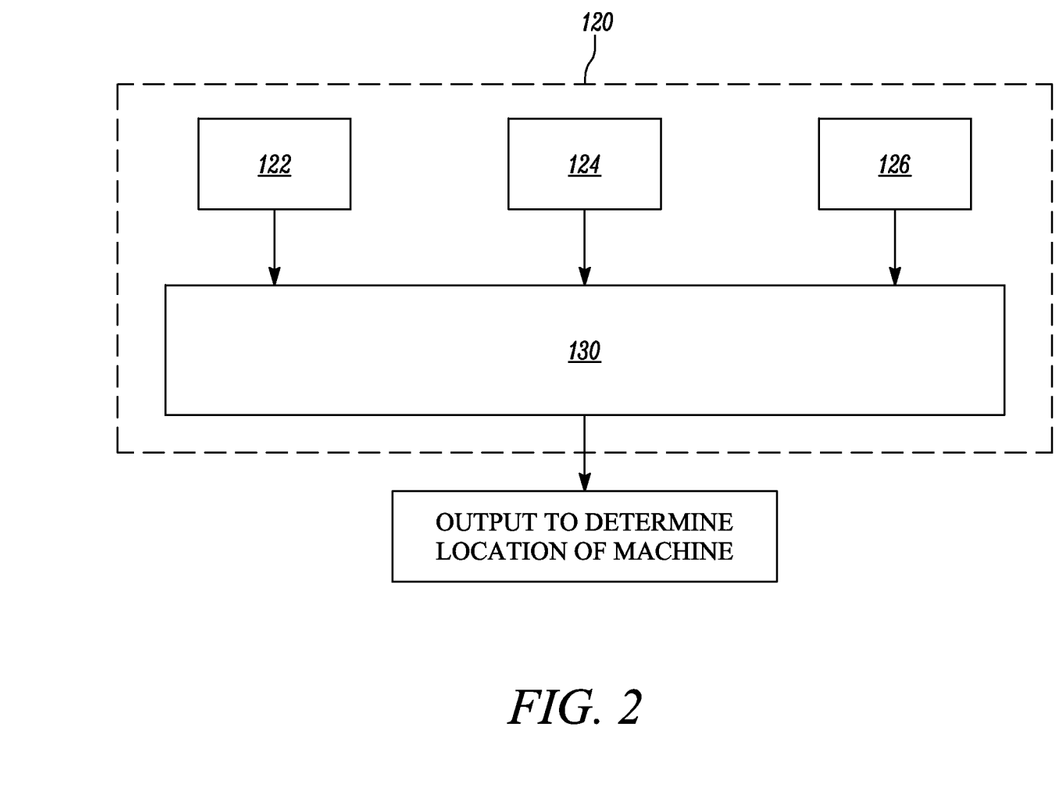
FIG. 2 is a block diagram of a positioning system determining a location of the machine in the worksite, according to an aspect of the current disclosure.

Referring to FIGS. 1 and 2, the positioning system 120 includes a satellite positioning unit 122 disposed on the machine 102. The satellite positioning unit 122 is configured to generate signals indicative of a location of the machine 102 in the worksite 100. In the illustrated aspect of the current disclosure, the satellite positioning unit 122 includes a Global Positioning Satellite (GPS) receiver. The satellite positioning unit 122 is disposed on top of the machine 102 to communicate with a plurality of satellites 123 and to receive signals indicative of a location of the machine 102 in the worksite 100. Specifically, the satellite positioning unit 122 is disposed on top of the operator cab 106 to receive signals from the satellites 123 without interfering with any surrounding components of the machine 102. In other aspects of the current disclosure, the satellite positioning unit 122 may be disposed at any location in the machine 102 to receive signals from the satellites 123 without any obstruction.

The positioning system 120 further includes an inertial measurement unit (IMU) 124 disposed in the machine 102. The IMU 124 is configured to generate signals indicative of a position of the machine 102 in the worksite 100. The position of the machine 102 in the worksite 100 may be detected based on rate of acceleration of the machine 102 and changes in rotational attributes of the machine 102 including pitch, roll and yaw. The IMU 124 may include a plurality of sensors to generate signals indicative of a position of the machine 102. The plurality of sensors may include accelerometers and gyroscopes. The plurality of sensors may be configured to generate signals indicative of various position attributes of the machine 102, such as a velocity of the machine 102, altitude/orientation of the machine 102 and a path of travel of the machine 102. The plurality of sensors may also include angular rate sensors and yaw rate sensors. Thus, the IMU 124 is configured to generate signals indicative of a relative change in various rotational attributes and position attributes of the machine 102.

The positioning system 120 further includes a sensing unit 126 configured to generate signals indicative of one or more operating parameters of the machine 102. In an aspect of the present disclosure, the sensing unit 126 may include perception sensors, such as cameras, radar and laser scanners. The perception sensors may be configured to capture images of surrounding of the machine 102 in the worksite 100. The perception sensors may be disposed on the frame 104 of the machine 102 to capture images of the surrounding of the machine 102. In another aspect of the current disclosure, the sensing unit 126 may include one or more speed sensors disposed in the machine 102 for generating signals indicative of a speed of travel of the machine 102. In various aspects of the present disclosure, the sensing unit 126 may include additional sensors for generating signals indicative of various operating parameters of the machine 102.

The positioning system 120 further includes a controller 130 configured to be in communicate with the satellite positioning unit 122 and the IMU 124. The controller 130 is communicated with the satellite positioning unit 122 to receive signals from the satellite positioning unit 122 indicative of a location of the machine 102 in the worksite 100. Further, the controller 130 is communicated with the plurality of sensors of the IMU 124 to receive signals indicative of the relative changes in the position and orientation of the machine 102 in the worksite 100. Specifically, the controller 130 receives signals indicative of the rate of acceleration of the machine 102 and rotational attributes of the machine 102. Thus, the controller 130 in communication with the IMU 124 may determine the position of the machine 102 based on the relative changes in the rotational attributes and the position attributes of the machine 102. In an aspect of the current disclosure, the controller 130 may be disposed in the machine 102 to communicate with the satellite positioning unit 122 and the IMU 124. In another aspect of the current disclosure, the controller 130 may be disposed in a command center 132 located remotely from the worksite 100. In various other aspects of the current disclosure, some control modules of the controller 130 may be disposed in the machine 102 and other control modules of the controller 130 may be disposed in the command center 132 such that the controller 130 may be functioned from the machine 102 and the command center 132. In the autonomous mode, the controller 130 may be configured to be in communication with the command center 132 via a wireless network system 133. The controller 130 is further configured to be in communication with the sensing unit 126 to receive signals indicative of various operating parameters of the machine 102 and surrounding of the machine 102 in the worksite 100.

Figure 3:
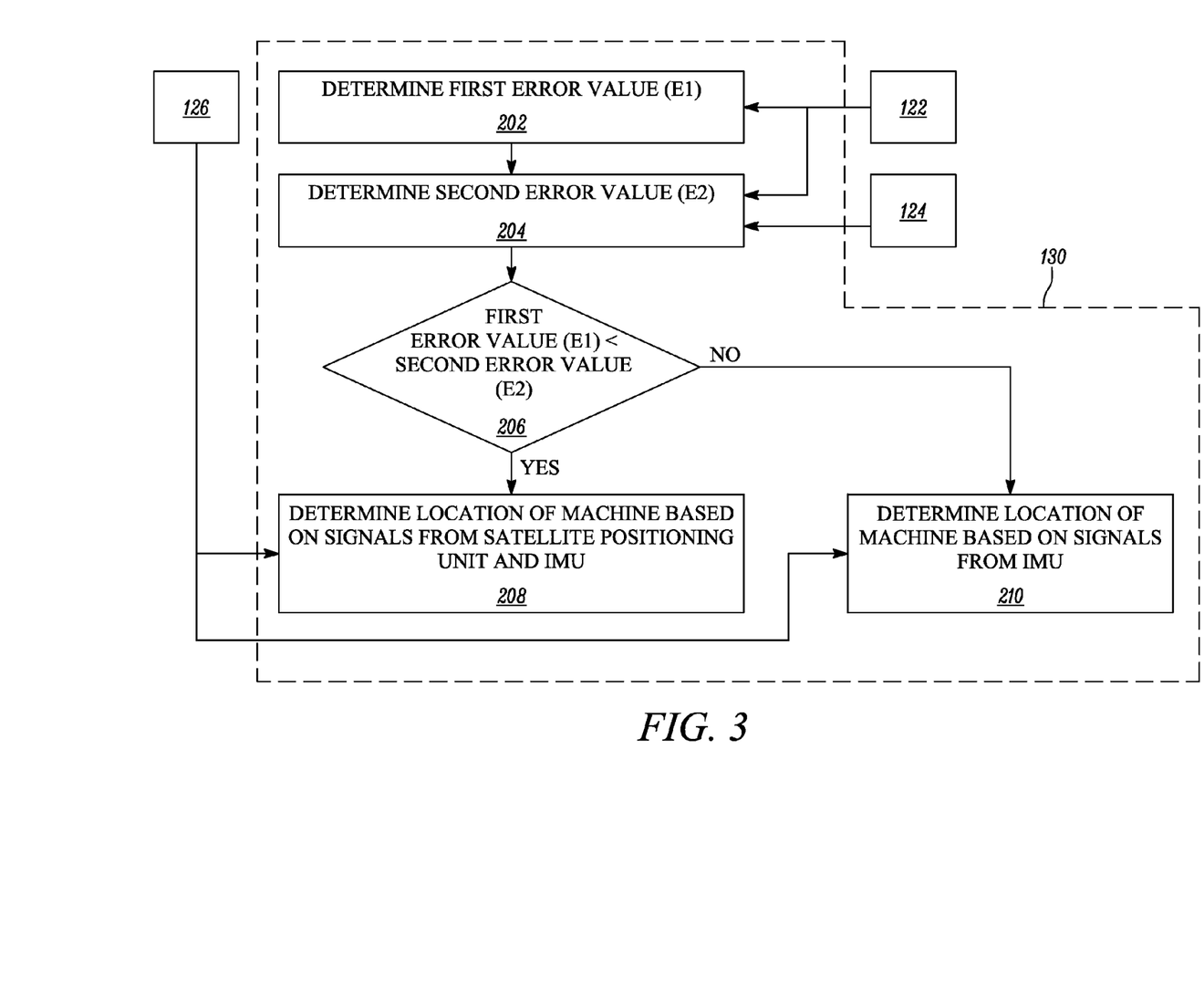
FIG. 3 is a block diagram illustrating a controller of the positioning system, according to an aspect of the current disclosure.

Referring to FIGS. 1 to 3, at step 202, the controller 130 is configured to determine a first error value 'E1' associated with a location of the machine 102 based on the signals received from the satellite positioning unit 122. The controller 130 in communication with the satellite positioning unit 122 may detect a location of the machine 102 in the worksite 100 based on the signals received from the satellites 123 and the signals generated by the satellite positioning unit 122. The first error value 'E1' may be determined based on a first predefined relationship between an actual location of the machine 102 in the worksite 100 and the location of the machine 102 detected by the controller 130 based on the signals received from the satellite positioning unit 122. In an example, the first predefined relationship may be a mathematical relationship defined further based on various parameters associated with GPS signal error. The parameters may include geometry of the satellites 123, human error, atmospheric effects and multipath travel of GPS signals. The first error value 'E1' may be further stored in a memory module of the controller 130. The memory module is configured to store various inputs and outputs associated with the controller 130.

In an aspect of the current disclosure, the controller 130 is configured to determine a mode at which the satellite positioning unit 122 receives signals from the satellites 123. In the illustrated aspect of the current disclosure, the mode includes Real Time Kinematic (RTK) fixed mode, RTK float mode, differential mode and autonomous mode. In other aspects of the current disclosure, the mode may be any other known GPS mode at which the satellite positioning unit 122 receives signals from the satellites 123. The controller 130 in communication with the satellite positioning unit 122 is configured to determine at least one of the RTK fixed mode, RTK float mode, differential mode and autonomous mode at which the satellite positioning unit 122 receives signals from the satellites 123. Accuracy and precision of signal information received by the satellite positioning unit 122 at the RTK fixed mode is higher than the RTK float mode. In other aspects of the current disclosure, the controller 130 in communication with the satellite positioning unit 122 may determine any known GPS mode, apart from the modes described above, at which the satellite positioning unit 122 receives signals from the satellites 123.

Figure 4:
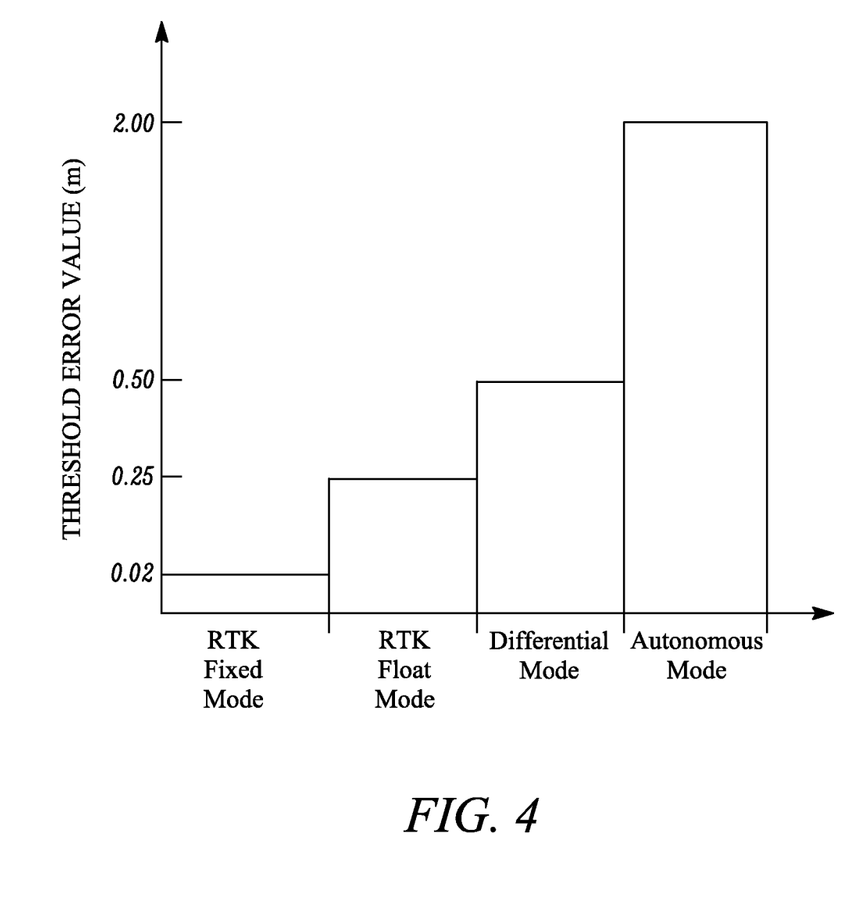
FIG. 4 is a graphical representation showing threshold error values corresponding to different mods at which a satellite positioning unit of the positioning system receives signals from satellites.

The controller 130 is further configured to determine the first error value 'E1' based on the determined mode. The first error value 'E1' corresponding to each of the modes varies based on the signals received from the satellites 123. In an exemplary aspect of the current disclosure, a threshold error value may be predefined for each of the modes (as shown in FIG. 4). The threshold error values may be stored in the memory module of the controller 130. In such a case, the controller 130 may be configured to select the corresponding threshold error value based on the determined mode. Further, the controller 130 may determine first error value 'E1' as being equal to the selected threshold error value.

At step 204, the controller 130 is configured to determine a second error value 'E2' associated with a location and a position of the machine 102 based on the signals received from the satellite positioning unit 122 and the signals received from the IMU 124, respectively. The second error value 'E2' may be determined based on a second predefined relationship between the signal information received from the IMU 124 and the satellite positioning unit 122. In an example, the second predefined relationship may be a mathematical relationship, such as a Kalman filter model that may be defined further based on various error source parameters, such as noise, associated with the signals. The second error value 'E2' may be further stored in the memory module of the controller 130.

At step 206, the controller 130 is configured to compare the first error value 'E1' and the second error value 'E2'. The first error value 'E1' and the second error value 'E2' may be compared based on a predefined relationship between the first error value 'E1' and the second error value 'E2'. In an example, the predefined relationship may be a mathematical relationship between first error value 'E1' and the second error value 'E2'. In another example, the predefined relationship may be a graphical relationship between first error value 'E1' and the second error value 'E2'.

At step 208, the controller 130 is configured to determine a location of the machine 102 based on the signals received from the satellite positioning unit 122 and the IMU 124, if the first error value 'E1' is less than the second error value 'E2'. The controller 130 in communication with the satellite positioning unit 122 and the IMU 124 receives signals generated by the satellite positioning unit 122 and the plurality of sensors of the IMU 124 to determine the location of the machine 102 in the worksite 100. Specifically, if the first error value 'E1' is less than the second error value 'E2', then the controller 130 accepts the signals generated by the satellite positioning unit 122 to determine the location of the machine 102.

Referring to FIG. 4, in an exemplary aspect of the current disclosure, the threshold error value may be predefined for each of the RTK fixed mode, the RTK float mode, the differential mode and the autonomous mode. Accuracy of signals received by the satellite positioning unit 122 from the satellites 123 is higher at the RTK fixed mode than the RTK float mode. Further, accuracy of signals received by the satellite positioning unit 122 from the satellites 123 at the differential mode is lesser than the RTK float mode and higher than the autonomous mode. In an example, the predefined threshold error value for the RTK fixed mode, the RTK float mode, the differential mode and the autonomous mode is 0.02 m, 0.25 m, 0.50 m and 2.00 m, respectively. If the second error value 'E2' is 0.03 m, then the controller 130 may accept the signals from the satellite positioning unit 122 only at the RTK fixed mode. In such a case, the controller 130 may determine the location of the machine 102 based on the signals received from the satellite positioning unit 122 at the RTK fixed mode and the signals received from the IMU 124. Similarly, if the second error value 'E2' is 2.10 m, then the controller 130 may accept the signals from the satellite positioning unit 122 at one of the RTK fixed mode, the RTK float mode, the differential mode and the autonomous mode. In such a case, the controller 130 may determine the location of the machine 102 based on the signals received from the satellite positioning unit 122 at one of the RTK fixed, the RTK float mode, the differential mode and the autonomous mode, and the signals received from the IMU 124.

At step 210, the controller 130 is configured to determine a location of the machine 102 based on the signals received from the IMU 124 if the first error value 'E1' is greater than the second error value 'E2'. If the first error value 'E1' corresponding to the signals generated by the satellite positioning unit 122 is greater than the second error value 'E2', then the controller 130 may reject the signals generated by the satellite positioning unit 122 and determine the location of the machine 102 in the worksite 100 based on the signals generated by the IMU 124.

In another aspect of the current disclosure, the controller 130 is configured to determine the location of the machine 102 further based on the signals received from the sensing unit 126. The controller 130 in communication with the perception module and the sensors of the sensing unit 126 determines various operating parameters of the machine 102 and detects surrounding of the machine 102 to enhance accuracy of the location of the machine 102 determined by the positioning system 120. The signals indicative of the various operating parameters of the machine 102 may be compared with the signals received from the satellite positioning unit 122 and the IMU 124 based on a predefined relationship to determine precise location of the machine 102 in the worksite 100. In an example, the predefined relationship may be a known mathematical relationship.

INDUSTRIAL APPLICABILITY

The current disclosure relates to the positioning system 120 and a method 300 for determining the location of the machine 102 in the worksite 100. The controller 130 in communication with the satellite positioning unit 122 and the IMU 124 determines the location of the machine 102 based on the comparison between the first error value 'E1' and the second error value 'E2'. Further, the controller 130 receives signals from the sensing unit 126 to enhance accuracy and precision of the location of the machine 102 determined by the controller 130.

Figure 5:
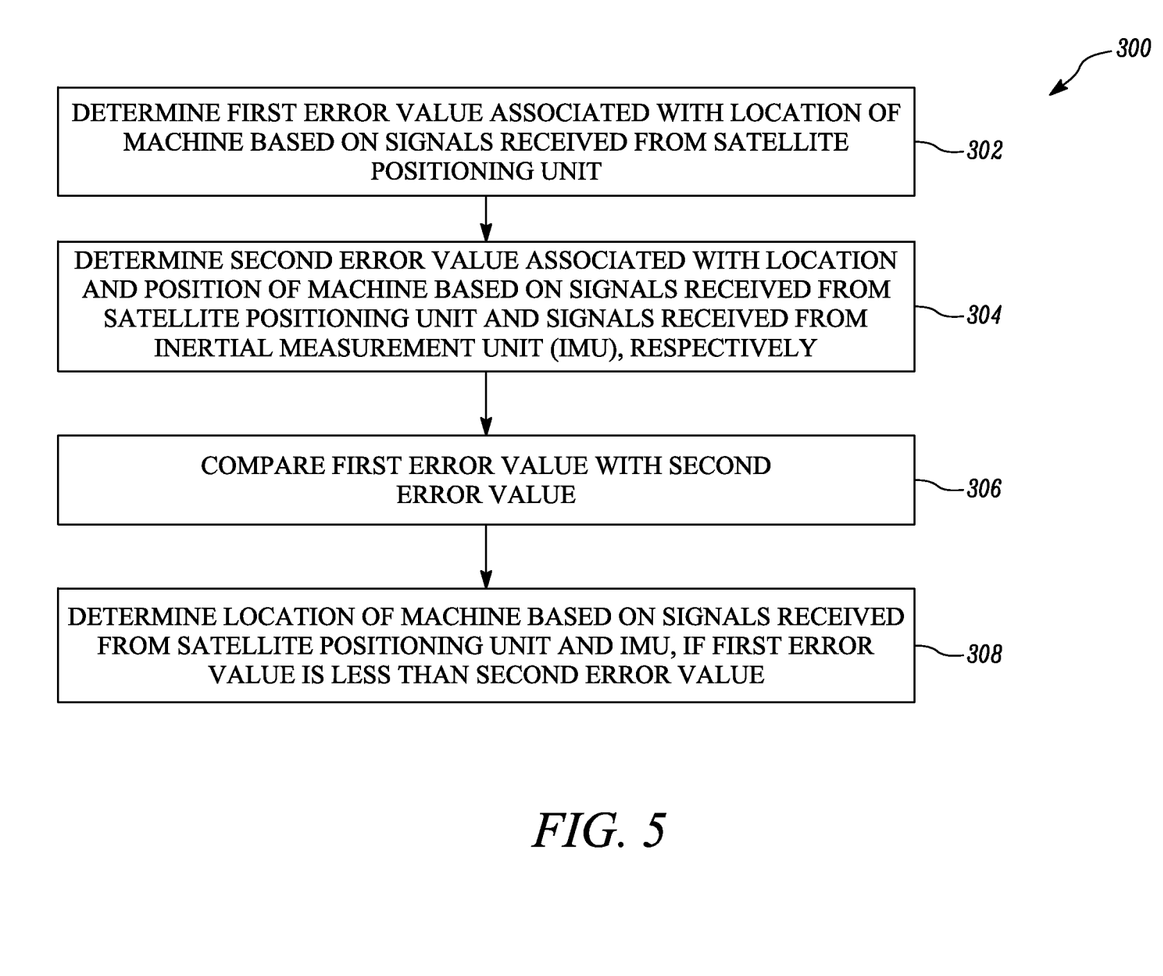
FIG. 5 is a flowchart of a method of determining the location of the machine in the worksite, according to an aspect of the current disclosure.

FIG. 5 illustrates a flowchart of the method 300 of determining the location of the machine 102, according to an aspect of the current disclosure. At step 302, the method 300 includes determining the first error value 'E1' associated with the location of the machine 102 based on signals received from the satellite positioning unit 122. The controller 130 receives signals generated by the satellite positioning unit 122 indicative of the location of the machine 102 and determines the first error value 'E1' based on the first predefined relationship. The controller 130 further determines the mode at which the satellite positioning unit 122 receives signals from the satellites 123. In another aspect of the present disclosure, the first error value 'E1' may be determined based on the threshold error value predefined for each of the RTK fixed mode, the RTK float mode, the differential mode and the autonomous mode. At step 304, the method 300 includes determining the second error value 'E2' associated with the location and the position of the machine 102 based on signals received from the satellite positioning unit 122 and signals received from the IMU 124, respectively. The controller 130 determines the second error value 'E2' based on the second predefined relationship. At step 306, the method 300 includes comparing the first error value 'E1' with the second error value 'E2'. The controller 130 further compares the first error value 'E1' and the second error value 'E2' based on the predefined relationship. At step 308, the method 300 includes determining the location of the machine 102 based on the signals received from the satellite positioning unit 122 and the IMU 124, if the first error value 'E1' is less than the second error value 'E2'. If the first error value 'E1' is less than the second error value 'E2', then the controller 130 accepts the signals generated by the satellite positioning unit 122 to determine the location of the machine 102 based on the signals received from the IMU 124.

In another aspect of the present disclosure, the method 300 includes determining the location of the machine 102 based on the signals received from the IMU 124 if the first error value 'E1' is greater than the second error value 'E2'. If the first error value 'E1' is greater than the second error value 'E2', then the controller 130 may reject the signals received from the satellite positioning unit 122 and accept only the signals from the IMU 124 to determine the location of the machine 102. In yet another aspect of the current disclosure, the controller 130 receives signals from the sensing unit 126 to enhance the accuracy and precision of the location of the machine 102 in the worksite 100.

While aspects of the current disclosure have been particularly shown and described above, it will be understood by those skilled in the art that various additional aspects may be contemplated by the modification of the disclosed machines, systems and methods without departing from the spirit and scope of what is disclosed. Such aspects should be understood to fall within the scope of the current disclosure as determined based upon the claims and any equivalents thereof.

What is claimed is:

1. A positioning system for a machine comprising:
   a satellite positioning unit disposed on the machine, the satellite positioning unit configured to generate signals indicative of a location of the machine in a worksite;
   an inertial measurement unit (IMU) disposed in the machine, the IMU configured to generate signals indicative of a position of the machine; and
   a controller in communication with the satellite positioning unit and the IMU, the controller configured to:
   determine a first error value associated with a location of the machine based on the signals received from the satellite positioning unit;
   determine a second error value associated with a location and a position of the machine based on the signals received from the satellite positioning unit and the signals received from the IMU, respectively;
   compare the first error value with the second error value; and
   determine a location of the machine based on the signals received from the satellite positioning unit and the IMU, if the first error value is less than the second error value.

2. The positioning system of claim 1, wherein the controller is further configured to determine the location of the machine based on the signals received from the IMU if the first error value is greater than the second error value.

3. The positioning system of claim 1, wherein the controller is further configured to determine a mode at which the satellite positioning unit receives signals from satellites.

4. The positioning system of claim 3, wherein the controller is further configured to determine the first error value based on the determined mode.

5. The positioning system of claim 4, wherein the controller is further configured to:
   select a threshold error value based on the determined mode; and
   determine the first error value as being equal to the selected threshold error value.

6. The positioning system of claim 3, wherein the mode comprises one of RTK fixed mode, RTK float mode, differential mode and autonomous mode.

7. The positioning system of claim 1 further comprising a sensing unit disposed in communication with the controller, the sensing unit configured to generate signals indicative of an operating parameter of the machine.

8. The positioning system of claim 7, wherein the controller is configured to determine the location of the machine further based on the signals received from the sensing unit.

9. A method of determining a location of a machine, the method comprising:
   determining a first error value associated with a location of the machine based on signals received from a satellite positioning unit;
   determining a second error value associated with a location and a position of the machine based on signals received from the satellite positioning unit and signals received from an inertial measurement unit (IMU), respectively;
   comparing the first error value with the second error value; and
   determining a location of the machine based on the signals received from the satellite positioning unit and the IMU, if the first error value is less than the second error value.

10. The method of claim 9 further comprising determining a location of the machine based on the signals received from the IMU if the first error value is greater than the second error value.

11. The method of claim 9 further comprising determining a mode at which the satellite positioning unit receives signals from satellites.

12. The method of claim 11 further comprising determining the first error value based on the determined mode.

13. The method of claim 9 further comprising determining the location of the machine further based on signals received from a sensing unit disposed in communication with a controller, the sensing unit configured to generate signals indicative of an operating parameter of the machine.

14. A machine comprising:
   a frame;
   a satellite positioning unit disposed on the frame of the machine, the satellite positioning unit configured to generate signals indicative of a location of the machine in a worksite;
   an inertial measurement unit (IMU) disposed in the machine, the IMU configured to generate signals indicative of a position of the machine; and
   a controller in communication with the satellite positioning unit and the IMU, the controller configured to:
      determine a first error value associated with the location of the machine based on the signals received from the satellite positioning unit;
      determine a second error value associated with the location and the position of the machine based on the signals received from the satellite positioning unit and the signals received from the IMU, respectively;
      compare the first error value with the second error value; and
      determine the location of the machine based on the signals received from the satellite positioning unit and the IMU, if the first error value is less than the second error value.

15. The machine of claim 14, wherein the controller is configured to determine the location of the machine based on the signals received from the IMU if the first error value is greater than the second error value.

16. The machine of claim 14, wherein the controller is further configured to determine a mode at which the satellite positioning unit receives signals from satellites, wherein the mode comprises one of RTK fixed mode, RTK float mode, differential mode and autonomous mode.

17. The machine of claim 16, wherein the controller is further configured to determine the first error value based on the determined mode.

18. The machine of claim 17, wherein the controller is further configured to:
   select a threshold error value based on the determined mode; and
   determine the first error value as being equal to the selected threshold error value.

19. The machine of claim 14 further comprising a sensing unit disposed in communication with the controller, the sensing unit configured to generate signals indicative of an operating parameter of the machine.

20. The machine of claim 19, wherein the controller is configured to determine the location of the machine further based on the signals received from the sensing unit.

* * * * *